INVENTORS:
Zeno Mutter &
Friedrich Wilhelm Dorn
By
Connolly and Hutz
ATTORNEYS

United States Patent Office 3,399,054
Patented Aug. 27, 1968

3,399,054
PROCESS FOR THE MANUFACTURE OF FERROMANGANESE AFFINÉ OF LOW SILICON CONTENT
Zeno Mutter, Knapsack, near Cologne, and Friedrich Wilhelm Dorn, Hurth, near Cologne, Germany, assignors to Knapsack Aktiengesellschaft, Knapsack, near Cologne, Germany, a corporation of Germany
Continuation-in-part of application Ser. No. 360,600, Apr. 17, 1964. This application Nov. 21, 1966, Ser. No. 595,651
4 Claims. (Cl. 75—80)

ABSTRACT OF THE DISCLOSURE

A process for making ferromanganese affiné having a silicon content of 1.5% or less and obtained by melting
(a) ferromanganese having high silicon concentration,
(b) an oxidic manganese ore and/or slag containing manganese oxide,
(c) a basic slag former and
(d) a flux.
The resulting low silicon-containing ferromanganese product is obtained when 90% of the (a) component consists of particles of .01–.3 mm. size and 10% less than .01 mm. size; and the (b) component is in the form of particles having a maximum size of 5–10 mm.

---

Figure 1:
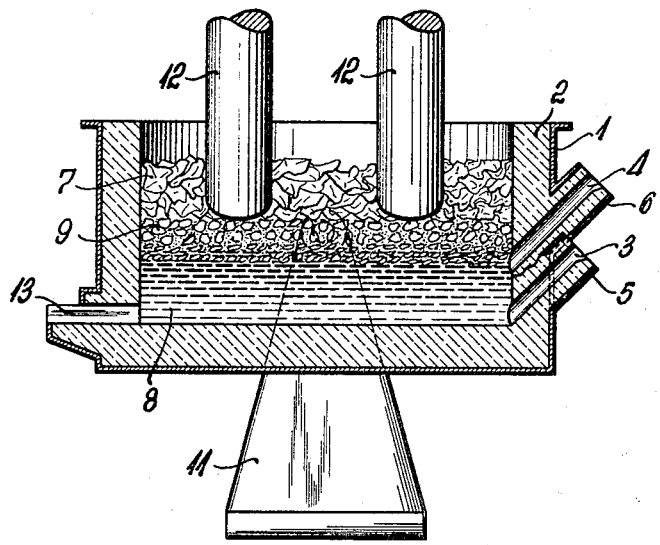

This is a continuation-in-part application of United States application Ser. No. 360,600, filed on Apr. 17, 1964, and now abandoned.

The present invention relates to a process for making ferromanganese having a maximum silicon content of 1.5% by weight, wherein a ferromanganese alloy having high silicon content is melted together with oxidic manganese ore or a slag containing manganese oxide, the melting operation being carried out in the presence of a basic slag former.

It is known that ferromanganese "affiné" containing 70–80% manganese and about 1% silicon can be produced by a two-stage process wherein, in the first stage, a ferromanganese-silicon alloy containing approximately 70% manganese and 20% silicon, the balance being iron, is prepared by melting a $SiO_2$-containing manganese ore having a manganese content of 30–50% together with refinery slag coming from the second stage, quartz, coke and optionally a slag former. From the resulting pre-alloy of relatively high silicon content the silicon is removed in the second stage by adding manganese ore and lime, the latter in a proportion sufficient to bind silicic acid formed during the refining step. Considerable difficulty arises, however, in effecting removal of the silicon from the ferromanganese of high silicon content; in an arc furnace, for example, the desiliconizing reaction proceeds with increasing difficulty and ultimately comes to a premature standstill prior to removal of the silicon from the ferromanganese and the associated depletion of the metal oxide content in the manganese ore. As a result the melt ultimately calls for the addition or repeated addition of fresh ore for removal of silicon from the ferromanganese of high silicon content to the contemplated extent. The refinery slag obtained by this process cannot be rejected due to its relatively high manganese content of up to about 25% by weight, but is used again for desiliconizing ferromanganese of high silicon content or, when its manganese content is lower than indicated above, is used again in the first melting stage together with the $SiO_2$-containing manganese ore. This is a complicated procedure and occupies a large space due to the large proportions of circulated slag, which may even require temporary storage. Further, the substance and energy yields are only moderate.

It has also been proposed to prepare ferromanganese of low silicon content by air-blowing ferromanganese of high silicon content under a cover of slag of high manganese oxide content. In this case, especially when the silicon content shall be reduced rather substantially, it is impossible to obviate rather considerable oxidation of the manganese in the alloy and the yields are poor, even if a portion of the oxidized manganese in the alloy is replaced with manganese formed by silicon reduction of the oxide in the slag.

Still further, it is known that ferro-alloys of low silicon content, especially ferromanganese or ferrochrome, can be prepared by a process wherein a ferromanganese or ferrochrome alloy of high silicon content prepared in conventional manner is intimately whirled up in the molten state together with a thinly fluid slag containing manganese oxide in the absence of any supply of gaseous oxidants. This method has the disadvantage that the two reaction partners must be melted in separate vessels so that continuous operation is rendered impossible.

Attempts have also been made to introduce a finely pulverized feed mixture consisting of manganese ore, ferrosilicon and calcium oxide into liquid ferromanganese so as to obtain a ferromanganese alloy having a manganese content of about 61% and a silicon content of about 5%. The slag removed from the alloy so produced still includes about 21% manganese, and the product cannot be termed ferromanganese "affiné" because the silicon content of such alloy is considerably above the commercial standard of about 1.5%. Furthermore, the resulting slag of high manganese content cannot be rejected, but must be used in further processing stages to recover and utilize the manganese.

The present invention now provides a proces for making ferromanganese having a maximum silicon content, of about 1.5% by weight, which obviates all of the aforesaid difficulties.

The process for making ferromanganese having a maximum silicon content of about 1.5% by weight by introducing a feed mixture formed of (a) ferromanganese of high silicon content, (b) a member selected from the group consisting of oxidic manganese ore and a slag containing manganese oxide, (c) a basic slag former and (d) a flux, into a melting pot, melting the fed mixture in the melting pot and removing liquid ferromanganese with a maximum silicon content of about 1.5% by weight and liquid slag separately from the melting pot, comprises more especially employing in the feed mixture a ferromanganese of high silicon content in the form of particles of which 90% have a size of about 0.01–0.3 mm. and of which 10% have a size below 0.01 mm., the (b) member being utilized in the form of particles having a maximum size of 5–10 mm.

According to a preferred embodiment of the process of the present invention the fed product is ferromanganese containing about 15–35% by weight silicon. The feed product is melted in the presence, for example, of quicklime and/or magnesium oxide or calcined dolomite as the basic slag former together with manganese ore and/or the slag contaning manganese oxide. The slag former is employed in a proportion by weight so that the molar ratio of slag former to $SiO_2$ in the slag is between about 1 and 2.5 after the reaction.

The slag obtained as the desiliconizing operation proceeds, which substantially consists of calcium or magnesium silicate, may have a melting temperature higher than the melting temperature of about 1400 to 1600° C.

customarily used, so that it may become necessary to admix the melt with an appropriate flux so as to maintain it in the thinly fluid state. Calcium fluoride has proved especially suitable for this. Attempts have shown that it is advantageous to add the calcium fluoride in a proportion of about 5 to 40% by weight, calculated on the ferromanganese of high silicon content.

The process of the present invention can be carried out in any conventional melting furnace, such as an arc furnace, graphite rod furnace, Tamman furnace or fuel-operated furnace provided, however, that the feed mixture is sufficiently comminuted. The manganese content and the residual silicon content in the ferroalloy prepared as the final product is decisively influenced by the particle size of the comminuted ferromanganese used as the feed. Coarse particles with a size above 0.3 mm. result in an increased silicon content beyond the standard of 1.5% by weight and in a reduced manganese content in the final alloy. The comminution of the feed alloy rich in silicon to reduce its particle size to less than 0.01 mm. is disadvantageous because unnecessary expense would be involved and because the gases evolved during melting would result in the finely comminuted material being ejected in an eruption-like manner from the melting pot. The decrease in the manganese content in the final alloy is simultaneously associated with an undesirable increase in the manganese content of the slag obtained as a by-product, which in this case cannot be rejected up.

The degree of comminution of the other reactants is of lesser importance. However, it has proved expedient to introduce the manganese ore and/or the slag containing manganese oxide in the state of fine division into the melt. Prior to its being fed to the melting furnace, the manganese ore is preferably air-roasted so as to expel humidity therefrom.

The process of the present invention is now described in greater detail with reference to an arc furnace. In this case, a portion of the finely pulverized feed mixture consisting of the ferromanganese of high silicon content, the manganese ore, quicklime and fluor spar is charged into the furnace and the arc is established. The rest of the feed mixture is added as the reaction proceeds, i.e., in such a manner that the melt surface be always covered with feed mixture. The feed is liquefied substantially in the vicinity of the electrodes. The reaction is complete substantially immediately with the termination of the feed addition, so that the material in the melting pot can be tapped immediately. Speaking generally, the melt discharges readily from the pot provided, however, that a sufficient quantity of fluor spar was added to the melt. The slag layer adhering to the furnace wall after tapping contains but small amounts of included metal. After cooling, the slag decomposes into powder form from which the metal is easy to separate.

The ferromanganese alloys produced by the process of the present invention is distinguished by their high manganese content of more than 80% by weight, and maximum silicon content of 1.5% by weight and maximum carbon content of 1–2% by weight, and thus meet standard specifications for ferromanganese of the type "affiné and suraffiné." The refinery slag obtained has an average manganese content of about 5% by weight, i.e., so low a content that contrary to the slag obtained in conventional processes, the slag obtained by the present method can be rejected. The present process omits the slag circulation of the conventional methods and therefore may be adapted to continuous operation.

Further, it is not necessary in the present process to thoroughly mix the feed mixture by stirring it or by other appropriate means, such as an induction furnace.

Figure 2:
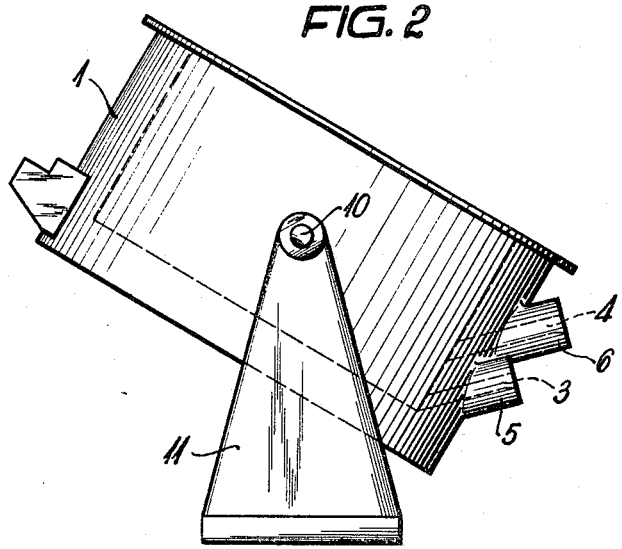

A melting pot especially suitable for use in carrying out the process of the present invention is shown diagrammatically in the accompanying drawing with reference to FIGS. 1 and 2, which permits continuous and separate removal of the products obtained by the process of the present invention, i.e., removal of the liquid ferromanganese and the slag layer floating on the metal. In FIGS. 1 and 2, numeral 1 denotes the melting pot provided with an internal refractory lining 2, for example, of magnesite tamping mass, and with upward-sloping channels 3 and 4 disposed at different levels in its walls. Outside the melting pot 1, the channels 3 and 4 end in sockets 5 and 6, so that liquid metal alloy 8 and liquid slag 9 collecting in melting pot 1 are forced by the pressure exerted by the feed column to ascend in channels 3 and 4 and to discharge to the outside.

The sockets 5 and 6 with channels 3 and 4 are preferably disposed at the walls of melting pot 1 at an angle of 45°. The feed mixture 7 can be melted by the arc established over the electrodes 12. The inside diameter of channels 3 and 4 and thus the velocity of flow of the liquid phases are a function of the capacity of the melting pot 1 or the furnace.

In order to prevent the channels 3 and 4 from becoming clogged at the start of the melting operation by prematurely solidifying melt, the inlet openings for the melt into channels 3 and 4 are closed by a tamping mass plug. In the order of succession slag spout-metal spout the plugs are pierced with an iron bar when the melting operation ensures that the slag or metal alloy flows off. The melting pot 1 may also be provided with a bottom taphole 13 so as to permit complete emptying thereof, if necessary or convenient. Still further, in order to ensure that the melting pot is completely emptied, the pot may be tiltably suspended from two pivotable bearing shafts 10 in pot holding means 11. FIG. 2 represents the melting pot in tilted position.

As mentioned above, the melting pot permits continuous operation since the liquid phases produced in the melting pot are continuously removed as overflow through sockets 5 and 6.

The present process for making ferromanganese of low silicon content is now described in greater detail with reference to the following working examples but without any limitation tot he details set forth therein.

EXAMPLE 1

30 kg. ferromanganese alloy of high silicon content containing—

| | Percent |
|---|---|
| Manganese | 67.5 |
| Silicon | 20.6 |
| Carbon | 1.3 | the balance being substantially iron, were finely comminuted to a maximum particle size of 0.1 mm. and intimately mixed with 28 kg. manganese are composed of—

| | Percent |
|---|---|
| Manganese | 46.2 |
| $Fe_2O_3$ | 6.6 |
| $SiO_2$ | 8.0 | and 30 kg. quicklime (about 95% CaO) and 9 kg. fluor spar. The manganese ore, quicklime and fluor spar had previously been ground to a particle size of up to 2 mm. The feed mixture so prepared was gradually fed to a graphite electrode operated arc furnace provided with a magnesite lining, and melted at a furnace voltage of about 100 volt. The melting reaction was complete after approximately 30 minutes. The liquid melt was tapped immediately thereafter and cooled.

Ferromaganese of low silicon containing—

| | Percent |
|---|---|
| Manganese | 85.6 |
| Silicon | 1.1 |
| Carbon | 1.4 | the balance being substantially iron, was obtained in a yield of 33.5 kg. 60 kg. slag containing 5.6% manganese were also obtained simultaneously therewith. 46 kw.-hr. were consumed.

EXAMPLE 2

1800 grams slag containing—

| | Percent |
|---|---|
| $SiO_2$ | 22.1 |
| CaO | 48.0 |
| Manganese | 5.7 |
| $CaF_2$ ___About__ | 6.0 | placed in a temperature resistant tube crucible having an inside diameter of 8 cm., were melted in a Tamman furnace, and a finely comminuted feed mixture of 300 grams ferromanganese-silicon having the composition set forth in Example 1, 280 grams manganese ore, 300 grams quicklime and 132 grams fluor spar was introduced within 10 minutes into the molten slag heated at 1600° C. The ferromanganese-silicon had a particle size of 0.1 to 1.0 mm. and the other components had a particle size of up to 2 mm.

After all had been placed into the crucible and melted, the resulting melt was poured off and cooled. Ferromanganese of low silicon content containing—

| | Percent |
|---|---|
| Manganese | 82.0 |
| Silicon | 0.74 | was obtained in a yield of 370 grams. There were also obtained 2.25 kg. slag containing 4.6% manganese which could be rejected.

EXAMPLE 3

(Comparative example)

A finely comminuted feed mixture having a particle size of 10 to 15 mm. was prepared from 36 kg. ferromanganese-silicon composed of—

| | Percent |
|---|---|
| Manganese | 67.5 |
| Silicon | 20.0 |
| Carbon | 1.3 | the balance being substantially iron, and from 33 kg. manganese ore containing—

| | Percent |
|---|---|
| Manganese | 46.2 |
| $Fe_2O_3$ | 6.6 |
| $SiO_2$ | 8.0 | and from 36 kg. quicklime and 11 kg. fluor spar. The feed mixture so prepared was melted in the arc in a manner analogous to Example 1, the melting reaction being complete after 53 minutes.

39 kg. ferromanganese containing—

| | Percent |
|---|---|
| Manganese | 79.8 |
| Silicon | 7.8 |
| Carbon | 1.32 | the balance being substantially iron, were obtained. 73 kg. slag having a manganese content of 10.1% were also obtained. 82 kw.-hr. energy were consumed for melting the feed mixture.

We claim:
1. In a one-step process for making ferromanganese affiné having substantially manganese content, a maximum silicon content of about 1.5% by weight, and a maximum carbon content of about 2% by weight while maintaining a low manganese concentration in the resulting slag; introducing into a melting pot a feed mixture formed of—
  (a) ferromanganese of high silicon content,
  (b) a member selected from the group consisting of oxidic manganese ore and a slag containing manganese oxide;
  (c) a basic slag former; and
  (d) a flux;
melting the feed mixture and removing liquid ferromanganese with a maximum silicon content of about 1.5% by weight and liquid slag separately from the melting pot; the improvement which comprises employing in the feed mixture said ferromanganese of high silicon content wherein about 90% have a particle size of about .01–.3 mm. and about 10% have a particle size less than 0.01 mm.; the (b) component having a maximum particle size of about 5–10 mm.

2. The process of claim 1, wherein said basic slag former is a member selected from the group consisting of quicklime, magnesium oxide, and calcined dolomite.

3. The process of claim 1, wherein said flux is calcium fluoride, said flux being added to the feed mixture in a proportion of about 5–40% by weight, calculated on the proportion of the ferromanganese of high silicon content in the feed mixture.

4. The process of claim 1 wherein the ferromanganese-silicon (a) having a silicon content of about 15–35% by weight is melted.

References Cited

UNITED STATES PATENTS

| | | | |
|---|---|---|---|
| 490,961 | 1/1893 | Greene et al. | 75—80 X |
| 1,363,657 | 12/1920 | Kalling et al. | 75—80 |
| 1,586,591 | 6/1926 | Wild | 75—130.5 |
| 1,596,999 | 8/1926 | Saklatwalla | 75—130.5 |
| 1,770,433 | 7/1930 | Saltrick | 75—130.5 |
| 1,925,886 | 9/1933 | Vignos | 75—133 |
| 2,064,441 | 12/1936 | Messenger | 75—130.5 |
| 2,621,119 | 12/1956 | Loveless | 75—130.5 |
| 3,085,004 | 4/1963 | Rathmann et al. | 75—130.5 |

HYLAND BIZOT, *Primary Examiner.*

H. W. TARRING, *Assistant Examiner.*